US010983971B2

(12) United States Patent
Carvalho et al.

(10) Patent No.: US 10,983,971 B2
(45) Date of Patent: Apr. 20, 2021

(54) DETECTING DUPLICATED QUESTIONS USING REVERSE GRADIENT ADVERSARIAL DOMAIN ADAPTATION

(71) Applicants: Vitor R. Carvalho, San Diego, CA (US); Anusha Kamath, Pittsburgh, PA (US)

(72) Inventors: Vitor R. Carvalho, San Diego, CA (US); Anusha Kamath, Pittsburgh, PA (US)

(73) Assignee: Intuit Inc., Mountain View, CA (US)

( * ) Notice: Subject to any disclaimer, the term of this patent is extended or adjusted under 35 U.S.C. 154(b) by 206 days.

(21) Appl. No.: 16/203,015

(22) Filed: Nov. 28, 2018

(65) Prior Publication Data

US 2020/0167325 A1    May 28, 2020

(51) Int. Cl.
*G06F 16/215* (2019.01)
*G06F 16/2455* (2019.01)
*G06F 16/28* (2019.01)

(52) U.S. Cl.
CPC ........ *G06F 16/215* (2019.01); *G06F 16/2455* (2019.01); *G06F 16/285* (2019.01)

(58) Field of Classification Search
CPC ... G06F 16/285; G06F 16/215; G06F 16/2455
See application file for complete search history.

(56) References Cited

U.S. PATENT DOCUMENTS

| | | | |
|---|---|---|---|
| 8,335,771 B1 * | 12/2012 | Natanzon | G06F 11/2074 707/684 |
| 10,339,101 B1 * | 7/2019 | Gupta | G06F 16/128 |
| 10,380,259 B2 * | 8/2019 | Lee | G06N 3/04 |
| 2010/0191686 A1 * | 7/2010 | Wang | G06F 16/33 706/46 |
| 2014/0201149 A1 * | 7/2014 | Wang | G06F 16/178 707/639 |
| 2017/0109355 A1 * | 4/2017 | Li | G06N 3/0445 |
| 2017/0262757 A1 * | 9/2017 | Martin | G06Q 10/105 |

(Continued)

OTHER PUBLICATIONS

Shah, Darsh J. et al., "Adversarial Domain Adaptation for Duplicate Question Detection", Association for Computational Linguistics, Proceedings of the 2018 Conference on Empirical Methods in Natural Language Processing, pp. 1056-1063 Brussels, Belgium, Oct. 31-Nov. 4, 2018. (Year: 2018) <NPL_Ad . . . pdf>.*

(Continued)

*Primary Examiner* — James Trujillo
*Assistant Examiner* — Michal Bogacki
(74) *Attorney, Agent, or Firm* — Ferguson Braswell Fraser Kubasta PC

(57) ABSTRACT

Detect duplicated questions using reverse gradient adversarial domain adaptation includes applying a general network to multiple general question pairs to obtain a first set of losses. A target domain network is applied to multiple domain specific network pairs to obtain a second set of losses. Further, a domain distinguishing network is applied to a set of domain specific questions and a set of general questions to obtain a third set of losses. A set of accumulated gradients is calculated from the first set of losses, the second set of losses, and the third set of losses. Multiple features are updated according to the set of accumulated gradients to train the target domain network.

20 Claims, 10 Drawing Sheets

(56) References Cited

U.S. PATENT DOCUMENTS

| | | | | |
|---|---|---|---|---|
| 2018/0024968 A1* | 1/2018 | Clinchant | ............ | G06N 3/0454 706/12 |
| 2018/0091457 A1* | 3/2018 | Bakis | ...................... | H04L 51/18 |
| 2018/0314716 A1* | 11/2018 | Kim | ........................ | G06F 16/51 |
| 2018/0341698 A1* | 11/2018 | Wang | ..................... | G06N 20/00 |
| 2019/0080225 A1* | 3/2019 | Agarwal | ................. | G06F 16/35 |
| 2020/0026767 A1* | 1/2020 | Chen | .................... | G06N 3/0445 |

OTHER PUBLICATIONS

Ganin, Yaroslav et al., "Domain-Adversarial Training of Neural Networks", Cornell University, Journal of Machine Learning Research, 2016, vol. 17, arXiv.1505.07818, May 26, 2016 (Year: 2016) <NPL_Domain-Adversarial_Training_of_Neural_Networks.pdf>.*

Ganin, Y. et al., "Unsupervised Domain Adaptation by Backpropagation"; Skolkovo Institute of Science and Technology, Feb. 27, 2015 (11 pages).

Wang, Z. et al.; "Bilateral Multi-Perspective Matching for Natural Language Sentences"; Proceedings of the Twenty-Sixth International Joint Conference on Artificial Intelligence, Melbourne, Australia, Aug. 19-25, 2017, pp. 4144-4150 (7 pages).

Tzeng, E. et al., "Adversarial Discriminative Domain Adaptation"; IEEE Conference on Computer Vision and Pattern Recognition (CVPR) Feb. 17, 2017 (10 pages).

Sener, O. et al., "Learning Transferrable Representations for Unsupervised Domain Adaptation"; Proceedings of the 30th International Conference on Neural Information Processing Systems (NIPS 2016), Barcelona, Spain, Dec. 5-10, 2016 (9 pages).

Sankaranarayanan, S. et al., "Generate to Adapt: Aligning Domains Using Generative Adversarial Networks"; Computer Vision and Pattern Recognition (CVPR) Apr. 6, 2017 (10 pages).

Qiu, M. et al., "Transfer Learning for Context-aware Question Matching in Information-Seeking Conversations in e-Commerce"; Proceedings of the 56th Annual Meeting of the Association for Computational alinguistics (Short Papers) Melbourne, Australia, Jul. 15-20, 2018, pp. 208-213 (6 pages).

Long, M. et al., "Deep Transfer Learning with Joint Adaptation Networks"; Proceedings of the 34th International Conference on Machine Learning, Sydney, Australia (PMLR 70) Aug. 6-11, 2017 (10 pages).

* cited by examiner

US 10,983,971 B2

DETECTING DUPLICATED QUESTIONS USING REVERSE GRADIENT ADVERSARIAL DOMAIN ADAPTATION

BACKGROUND

Many companies receive hundreds and thousands of queries from users across all of their product networks. A majority of these queries relate to the user asking a question to solve a particular problem within the application. For example, a user may not know how to use a particular function within the application and may consult the help menu within the application to find a solution. Companies may store these questions in a database to determine which questions and answers were helpful to solving a user's problem and to assist in providing the best solution to the user.

Many large companies devote significant resources to the data infrastructure to support the volume of queries received on a daily basis worldwide. However, many of these queries may be similar to previous queries from other users in various forms. For example, multiple queries may exist that relate to performing the same function, where the multiple queries are worded in different manners. For example, the myriad of duplicate queries may account for significant storage space. By way of another example, the company may devote resources to answering previously answered queries.

SUMMARY

In general, in one aspect, one or more embodiments relate to a method that includes applying a general network to general question pairs to obtain a first set of losses, applying a target domain network to domain specific network pairs to obtain a second set of losses, and applying a domain distinguishing network to a set of domain specific questions and a set of general questions to obtain a third set of losses. The method further includes calculating a set of accumulated gradients from the first set of losses, the second set of losses, and the third set of losses, and updating features according to the set of accumulated gradients to train the target domain network.

In general, in one aspect, one or more embodiments relate to a system that includes a data repository, a general network, a target domain network, and a domain distinguishing network. The data repository includes domain specific questions, and general questions. The general network includes a general feature layer and a shared feature layer. The target domain network includes a domain specific feature layer and the shared feature layer. The domain distinguishing network includes a gradient reversal layer and the shared feature layer. The shared feature layer spans the general network, the target domain network, and the domain distinguishing network. The domain distinguishing network is configured to generate a set of gradients to train the target domain network based on the domain specific questions and the general questions.

In general, in one aspect, one or more embodiments relate to a non-transitory computer readable medium that includes computer readable program code for causing a computer system to perform operations. The operations include applying a general network to general question pairs to obtain a first set of losses, applying a target domain network to domain specific network pairs to obtain a second set of losses, and applying a domain distinguishing network to a set of domain specific questions and a set of general questions to obtain a third set of losses. The operations further include calculating a set of accumulated gradients from the first set of losses, the second set of losses, and the third set of losses, and updating features according to the set of accumulated gradients to train the target domain network.

Other aspects of the invention will be apparent from the following description and the appended claims.

DETAILED DESCRIPTION

Figure 1:
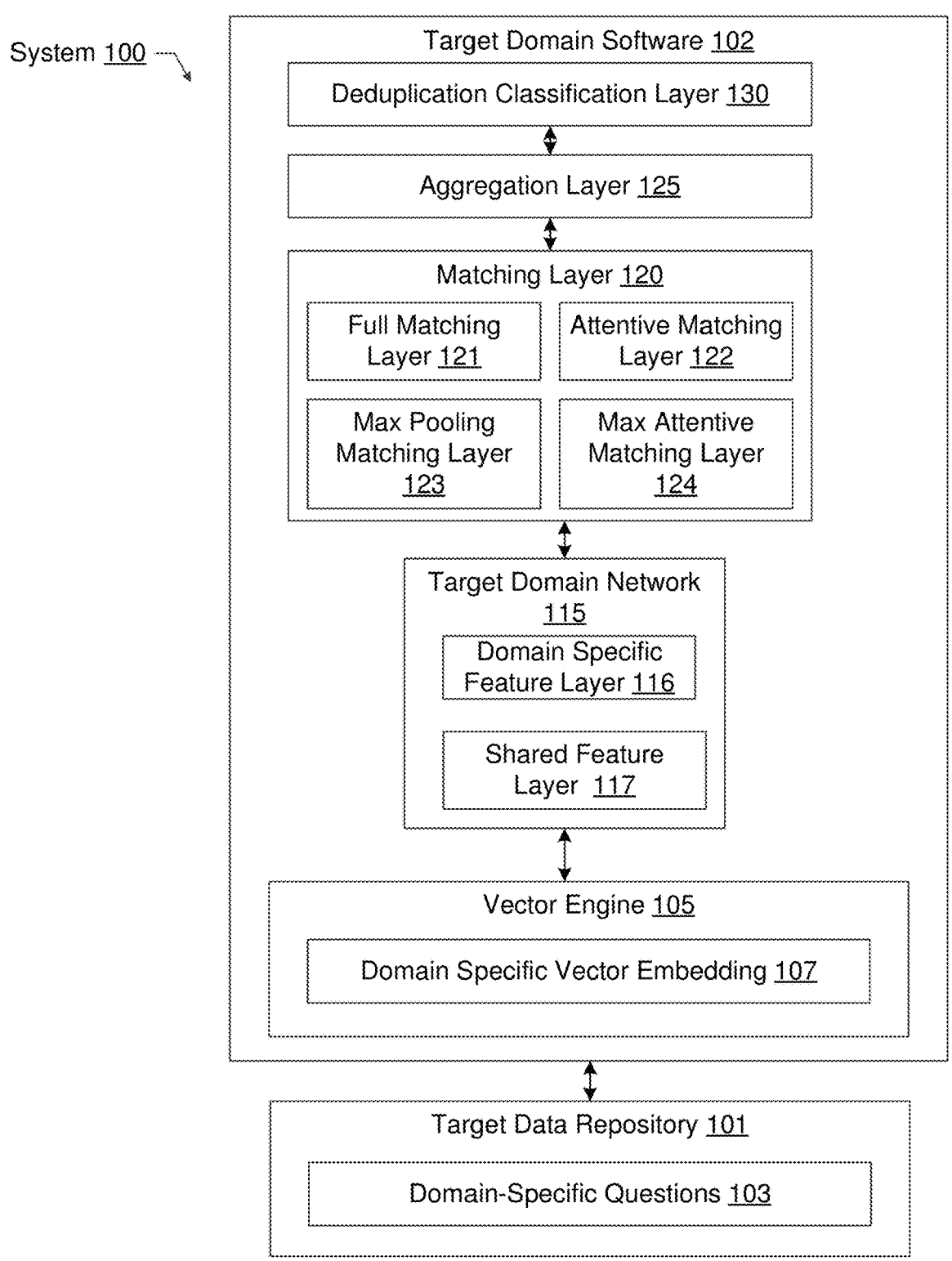
FIG. 1 shows a system use diagram in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a machine learning technique to manage duplicate questions in a specific domain. In particular, large volumes of duplicate questions cause excess processing and storage resources usage. For example, when a duplicate question is received that was previously asked, the system expends various resources to re-answer the duplicate question. Likewise, duplicate questions that are stored can cause excess storage requirements in storing the duplicate question and the corresponding one or more answers. Moreover, identifying duplicates in large volumes of questions may be too time consuming for a human, and technically challenging for a computing system.

A computing system may have a particular challenge exists in using machine learning to identify duplicate questions in a specific domain. Machine learning requires being able to train the machine learning model using a sufficient amount of training data. In specific domains, the amount of training data may not be sufficient to train a machine learning model for the specific domain. One or more embodiments are directed to training a machine learning model that identifies duplicates in a specific domain using training data from a general domain and in the specific domain. The general domain is domain that spans one or more other domains.

If the training data from the general domain were used directly, the machine learning model may not be accurate in determining duplicate questions in the same specific domain. In other words, the machine learning model would determine that most questions in the specific domain were duplicates based on using terminology that is particular to the specific domain. For example, if the specific domain is financial, then the machine learning model may be incorrectly trained to determine that all questions related to tax are duplicates, including questions of "When can I file my taxes?" and "When can I deduct my car expenses in my taxes?".

In order to use the general domain to train a specific domain, one or more embodiments use adversarial learning. The adversarial learning determines the distinguishing features that distinguish between the specific domain and the general domain. The adversarial learning then trains the machine learning model to not use or reduce the importance of the distinguishing features. Accordingly, one or more embodiments provide a technique for using a machine learning model, trained using both specific domain training data and general domain training data, to identify duplicate questions in the specific domain.

Figure 10A:
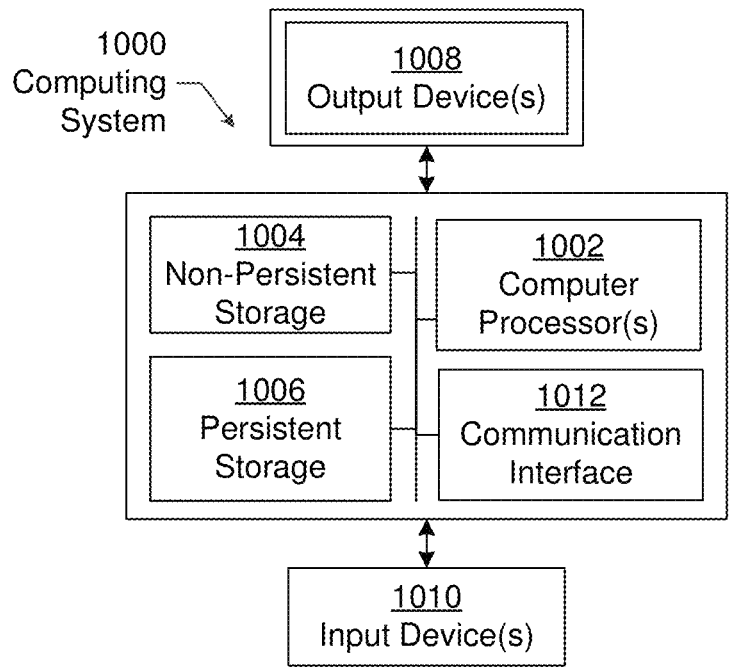
FIGS. 10A and 10B shows a computing system in accordance with one or more embodiments.
Figure 10B:
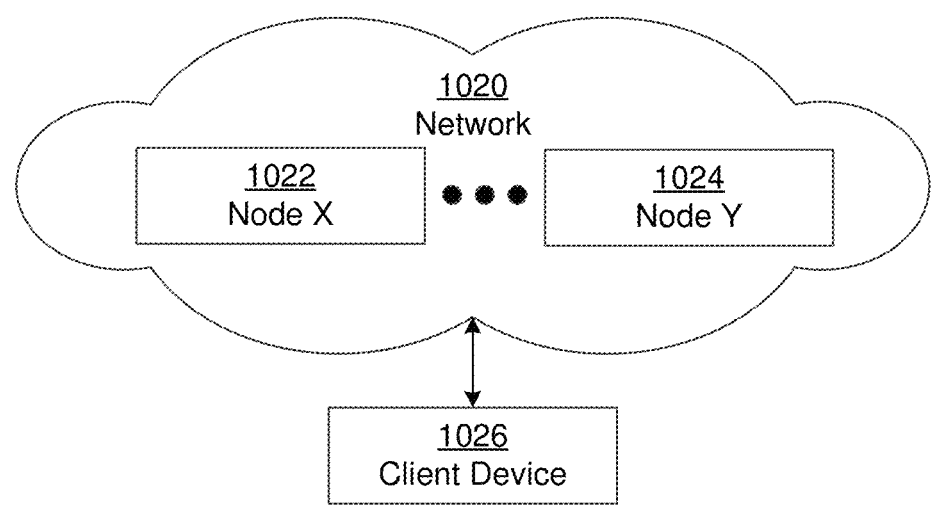

FIG. 1 shows a block diagram of a system (100) for using a machine learning model in accordance with one or more embodiments. A shown in FIG. 1, the system (100) has multiple components including a target data repository (101) and system software (102) including a vector engine (105), a target domain network (115), a matching layer (120), an aggregation layer (125), and a classification layer (130). The various components may execute on a computing device, such as the computing device described below with reference to FIGS. 10A and 10B. Each of these components is described below.

In one or more embodiments of the invention, the target data repository (101) is any type of storage unit and/or device (e.g., a file system, database, collection of tables, or any other storage mechanism) for storing data. Further, the target data repository (101) may include multiple different storage units and/or devices. The multiple different storage units and/or devices may or may not be of the same type or located at the same physical site.

The target data repository (101) may store domain specific questions (103). The domain specific questions (103) are questions from users of a domain-related application. A question is an explicit or implicit request for information. For example, a question may be a statement that indicates frustration with a product or process. In such a scenario, the statement is an implied request to solve the frustration. The question may be an incomplete sentence, a complete sentence, multiple sentences, a multipart sentence, any combination thereof, or any other mechanism for formulating a request. Further, a question may include spelling and grammatical errors, acronyms, and other defects.

The domain specific questions are questions that are specific to a particular domain. In other words, outside A domain is a sphere of activity or knowledge. For example, a domain may be financial, taxes, legal, education, business, personal financial management, construction, etc. In one or more embodiments, the domain specific questions (103) are input by the users into one or more domain-related applications. For example, a user may input the domain specific questions when searching for an item within the one or more domain-related application, using a website associated with the domain related application, or asking a question of help within the domain-related application. For example, a user may access the help section of a financial management application to ask a question related to inserting a W2 form.

The target data repository (101) is connected to target domain software (102). Target domain software (102) is software that is configured to perform tasks for the target domain. For example, target domain software (102) may be application level software that is configured to receive and answer domain specific questions from users. By way of another example, the target domain software (102) may be system software that manages storage of data, processing resources, relationships between data in storage, etc. The target domain software (102) includes a machine learning tool to process questions and identify duplicate questions. In one or more embodiments, the machine learning tool is an implementation of a bilateral multi-perspective matching model. The implementation of the bilateral multi-perspective matching model matches the questions in a forward and backward direction to output a probability that the two questions match.

The machine learning tool includes multiple layers. Each layer may be implemented as a software component of the target domain software (102). The layers include a vector engine (105), target domain network (115), matching layer (120), aggregation layer (125), and deduplication classification layer (130). Each of these layers are presented below.

In one or more embodiments, the system (100) includes a vector engine (105). The vector engine (105) is a framework that includes functionality to transform the words from the domain specific questions (103) into a domain specific vector embedding (107). The vector engine (105) includes a word to indices mapping. The word to indices mapping may be referred to as an encoder dictionary. The word to indices mapping maps individual words of the domain specific question (103) to an index value. A set of words are selected from the domain specific questions (103). Each word in the set of words has a unique location in a vector space. The words to indices mapping defines the location of the characters in the vector space. When mapping a domain specific question (103), each word may be a one-hot vector, or giant vector of zeros except for a single one at the index of the word. Thus, for example, the word to indices mapping may map the word "network" in the question "Why isn't my network functioning" to 05, which is represented by the vector [0 0 0 0 0 1 0 0 0 . . . ]. The domain specific vector embedding (107) is a numerical vector result of the word to indices mapping of the domain specific question (103). For example, a question such as "How do I save?" may be converted into a numerical vector such as "8152349191225". While the above is a single example, the domain specific vector embedding is not limited to a numerical vector result and may be any type of data structure (e.g., list, array, binary tree).

The vector engine (105) is communicatively connected to a target domain network (115). The target domain network (115) is a machine learning model that is configured to extract, and process features from the domain specific questions. Specifically, the target domain network is configured to create an output vector that encodes the meaning of the domain specific question. By way of an example, the target domain network may be a neural network. In one or more embodiments, the target domain network (115) may be a bilateral long short term memory (Bi-LSTM) network or another recurrent neural network (RNN).

In general, an RNN is a network of neuron-like nodes organized into successive "layers", each node in a given layer is connected with a directed connection to nodes in the next successive layer. Each node has a time-varying real-valued activation. Each connection has a modifiable real-valued weight. Nodes are either input nodes (receiving data from outside the network), output nodes (yielding results), or hidden nodes (that modify the data en route from input to output). Nodes operate on features within the input vector from the vector engine. The activation and weights of the nodes are the parameters that are modified during training to correctly extract features that will be used during the matching layer (120).

In one or more embodiments, to determine the parameters of the target domain network (115), the target domain network (115) requires training as a machine learning model. The training may require a vast amount of input in the form of paired questions. In one or more embodiments, the target domain network (115) has a small number of paired domain specific questions to use as training. In other words, the target domain network (115) requires more than just the domain specific paired questions to use as training, hence, the target domain network (115) may use a shared feature layer (117) as well as the domain specific feature layer (116).

In one or more embodiments, the domain specific feature layer (116) is one or more feature layers of the target domain network that are specific to the target domain. Specifically, the domain specific feature layer (116) is at least one layer of nodes of the recurrent neural network that are only trained using domain specific question pairs.

The shared feature layer (117) is one or more feature layers of the target domain network that are not specific to the target domain. Specifically, the shared feature layer (117) is at least one layer of nodes of the recurrent neural network that are trained using domain specific question pairs and general question pairs. In the execution system as shown, the domain specific questions are processed through both the domain specific feature layer (116) and the shared feature layer (117). Although FIG. 1 shows a particular order between the domain specific feature layer (116) and the shared feature layer (117), the domain specific feature layer (116) and the shared feature layer (117) may be in any order. Further, the multiple layers may be interleaved.

The output of the target domain network (115) is an individual extracted features set that is an encoding of the meaning of the domain specific question. In one or more embodiments, the individual extracted features set is a vector encoding of the meaning of the question.

Continuing with FIG. 1, the matching layer (120) matches the domain specific questions (103) to identify possible duplicates between the domain specific questions. Specifically, from the target domain network (115), the meanings of the domain specific questions is encoded into the individual extracted features sets. The matching layer matches the domain specific questions based on the encoded meanings. In one or more embodiments, the matching layer (120) implements multiple matching algorithms, whereby each matching algorithm outputs an individual probability that a set of two or more domain specific questions are duplicates. In one or more embodiments, the shared matching layer (120) includes a full matching layer (121), an attentive matching layer (122), a max-pooling matching layer (123), and a max attentive matching layer (124). Each of these components is described below.

In one or more embodiments, the full matching layer (121) matches extracted feature sets from domain specific questions. In one or more embodiments, the attentive matching layer (122) calculates the cosine similarities between the extractive feature sets. The attentive layer (122) may then calculate an attentive vector for the extracted feature sets by weighted summing the extracted feature set. In one or more embodiments, the max-pooling matching layer (123) compares the forward pass of a first extractive feature set in a pairing to the forward pass of a second extractive feature set in the pairing. In one or more embodiments, the maximum value of the loss is retained for the max-pooling matching layer (123). In one or more embodiments, the max attentive matching layer (124) chooses the extractive feature set with the highest cosine similarity as the attentive vector. The extractive feature set of each domain specific question in the pairing may then be matched to the new attentive vector.

In one or more embodiments, the aggregation layer (125) aggregates the outputs from the various algorithms in the matching layer (120). In one or more embodiments, the aggregation layer (125) is an aggregating attention layer followed by a single layer network, which differs from the aggregation LSTM found in the standard BiMPM.

In one or more embodiments, the deduplication classification layer (130) receives the aggregated results from the aggregation layer (125) and calculates a probability that the domain specific questions (103) are duplications or not duplications. In other words, the deduplication classification layer (130) is able to determine if the pair of domain specific questions (103) are duplicated regardless if the wording between the two domain specific questions is similar. For example, the two questions may be "How do I create an invoice?" and "Invoice creation" which, though worded differently, are asking the same question.

While FIG. 1 shows a configuration of components, other configurations may be used without departing from the scope of the invention. For example, various components may be combined to create a single component. As another example, the functionality performed by a single component may be performed by two or more components.

Figure 2:
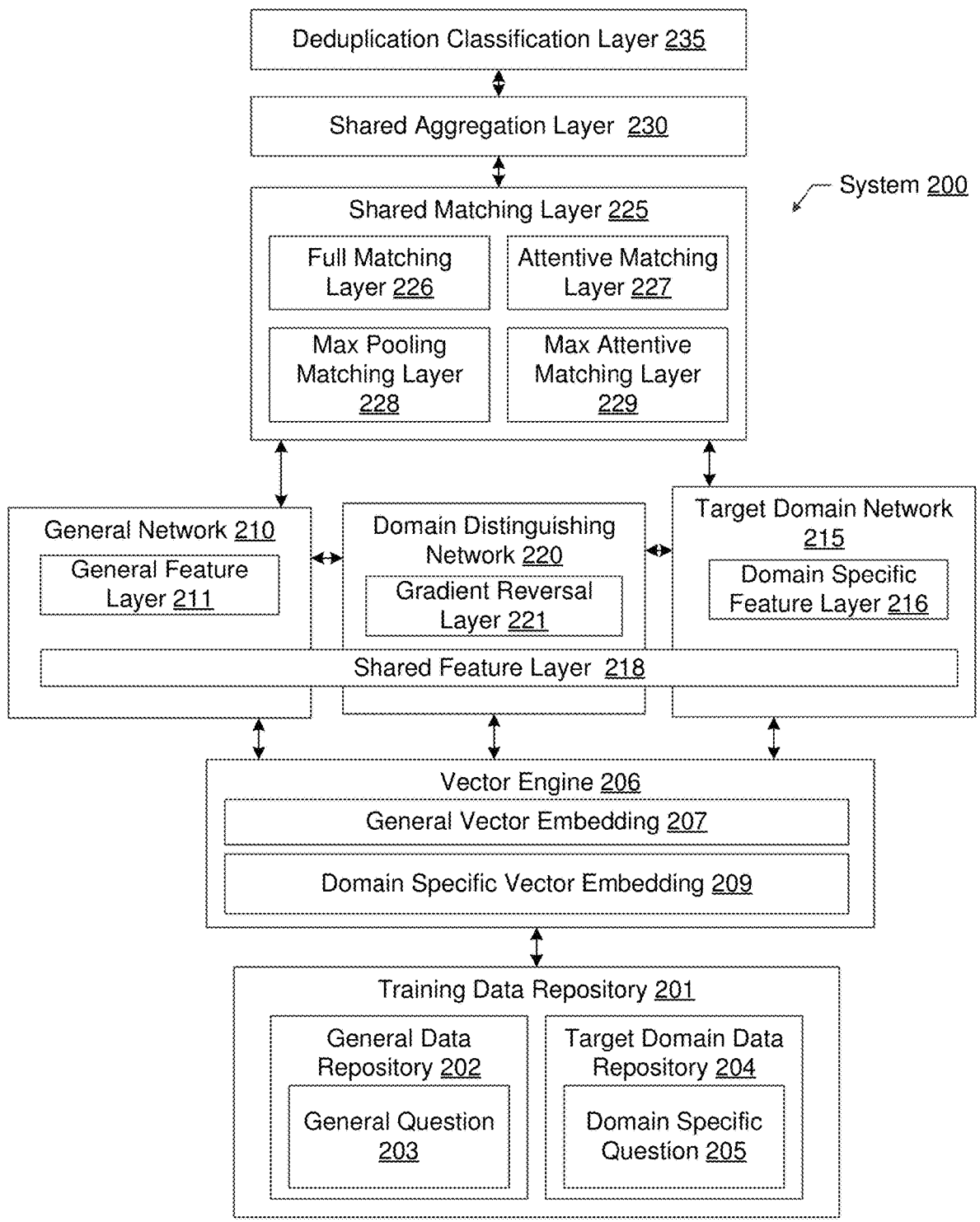
FIG. 2 shows a system training diagram in accordance with one or more embodiments.

FIG. 2 shows a block diagram of a system (200) for training the machine learning tool in FIG. 1 in accordance with one or more embodiments. A shown in FIG. 2, the system (200) has multiple components including a training data repository (201), a vector engine (206), a general network (210), a target domain network (215), a domain distinguishing network (220), a shared matching layer (225), a shared aggregation layer (230), and a deduplication classification layer (235). The training system may also include an evaluation and update engine that is configured to train the machine learning tool. Each of these components is described below.

In one or more embodiments of the invention, the training data repository (201) is any type of storage unit and/or device (e.g., a file system, database, collection of tables, or any other storage mechanism) for storing data. Further, the training data repository (201) may include multiple different storage units and/or devices such as a general data repository (202) and a target domain data repository (204). The multiple different storage units and/or devices may or may not be of the same type or located at the same physical site. The training data repository (201) may be the same or different as the data repository in FIG. 1.

In one or more embodiments, the general data repository (202) and target domain data repository (204) are storage units used for training the overall system (200). The general data repository (202) may include a general question (203). The general questions (203) are questions that are not related to a specific domain and are considered to be general in subject manner. For example, a general question may be "Is this a picture of a dog?" The general questions (203) in the training data repository (201) are paired to other general questions to form a general question pairing based on being duplicates. In other words, in the training data repository (201), which questions are duplicates are known.

In one or more embodiments, the target domain data repository (204) may include domain specific questions (205). The domain specific questions (205) are questions from users of a domain-related application. The domain specific questions (205) may be related to any particular domain (e.g., financial, business, personal finance management). In one or more embodiments, the domain specific question (205) are input by the users into the domain-related application and then stored in the target domain data repository (204). For example, a user may access the help section of a financial management application to ask a question related to inserting a W2 form. As with the general questions (203) in the training data repository (201), the domain specific questions (205) are paired with other domain specific questions to form a domain specific question pairing based on being duplicates.

In one or more embodiments, the number of general questions is several orders of magnitude more than the number of domain specific questions in the training data repository. For example, the number of general questions that are grouped into duplicates may be four hundred thousand, while the number of domain specific questions may only be four thousand.

In one or more embodiments, the system (200) includes a vector engine (207). The vector engine (206) is a framework that includes functionality to transform the words from the general questions (202) and domain specific questions (205) into a general vector embedding (207) and domain specific vector embedding (207) respectively. The vector engine (206) and domain specific vector embedding (207) are the same as described above with reference to FIG. 1. The general vector embedding (207) is similar to the domain specific vector embedding as described above with reference to FIG. 1 but is generated from the general question (203). In one or more embodiments, the same word to indices mapping is used for general questions (203) as for the domain specific questions (205) to generate the respective embedding.

Continuing with FIG. 2, the vector engine (206) is connected to a target domain network (215), general network (210), and the domain distinguishing network (220). The target domain network (215) is the same as the target domain network (115) described above with reference to FIG. 1. Specifically, like FIG. 1, the target domain network (215) includes multiple layers in training, such as a domain specific feature layer (216) and the shared feature layer (218).

The general network (210) is similar to the target domain network (115) described above with reference to FIG. 1, but the general network (210) is trained using only the general vector embedding. The general network (210) may be an RNN, such as a Bi-LSTM, that is configured to generate an individual extracted feature set for each general question based on the meaning of the general question from the general vector embedding. Similar to the target domain network (115), the general network (210) includes a general feature layer (211) and shared feature layer (218). The general feature layer (211) is at least one layer of the nodes of the general network (210) that is trained using only the general questions. In other words, the general feature layer (211) is specific to the general questions. The shared feature layer (218) is the same as the shared feature layer (217) described above with reference to FIG. 1. The shared feature layer (217) during training spans the general network (210), the target domain network (215), and the domain distinguishing network (220). In other words, the shared feature layer (217) is trained using both the general vector embedding (207) and the domain specific vector embedding (209). Because the shared feature layer (217) is trained across networks, the shared feature layer (217) causes the target domain network (215) to have the advantage of the amount of training data in the general data repository (202). In other words, the meanings of the target domain questions may be learned, in part, based on meanings learned from the general questions by the shared feature layer (217).

In one or more embodiments, the training system (200) includes a domain distinguishing network (220). The domain distinguishing network (220) include functionality to identify domain discriminators. Domain discriminators are features of the general questions and domain specific questions that distinguish the domain specific questions from the general questions. The domain distinguishing network (220) is used for adversarial learning. In adversarial learning, as the domain distinguishing network is trained to be able to distinguish between general questions and domain specific questions, the target domain network is trained to not use or reduce the importance of the domain discriminators. In other words, the importance of the domain discriminators is reduced in the shared feature layer by modifying the parameters associated with the domain discriminators.

The domain distinguishing network (220) further includes a gradient reversal layer (221). In one or more embodiments, the gradient reversal layer (221) learns the which pairings compensate for domain mismatch while incorporating domain specific features that may improve the performance of the domain distinguishing network (220. In one or more embodiments, the gradient reversal layer (221) executes a number of forward and backward passes to determine which features from the pairing of the general question (203) and the domain specific question (205) are domain specific. During the forward pass, the gradient reversal layer (221) may act as an identity transform, while in the backward pass, the gradient reversal layer (221) may take the general vector embedding (207) and the domain specific vector embedding (209) from the previous layers and multiply the gradient by a pre-determined amount before passing general vector embedding (207) and the domain specific vector embedding (209) to the preceding layers.

Continuing with FIG. 2, the shared matching layer (225), including the full matching layer (226), attentive matching layer (227), max pooling matching layer (228), and max attentive matching layer (229) are the same as the like named components, respectively, of FIG. 1. In one or more embodiments, the aggregation layer (230) and the deduplication classification layer (235) are the same as the like named components of FIG. 1.

While FIG. 2 shows a configuration of components, other configurations may be used without departing from the scope of the invention. For example, various components may be combined to create a single component. As another example, the functionality performed by a single component may be performed by two or more components.

Figure 3:
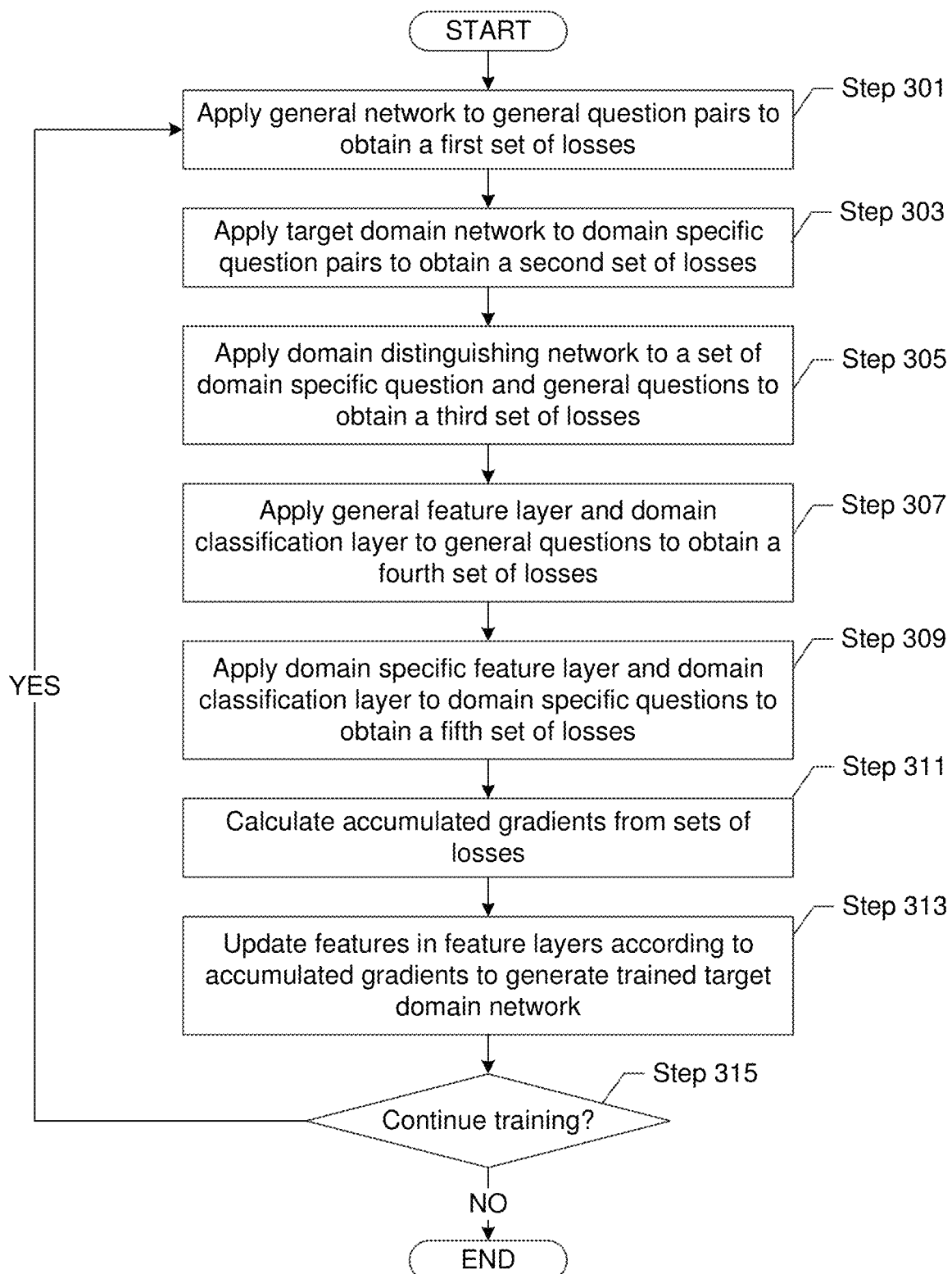
FIG. 3 shows a method in accordance with one or more embodiments.

FIG. 3 is a flowchart diagram of the process for detecting duplicated questions using reverse gradient adversarial domain adaptation. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 301, a general network is applied to general question pairs to obtain a first set of losses. In one or more embodiments, general questions in the training data set are processed individually through general feature layer(s) and the shared feature layer(s). The result is the encoded feature set for the general question. The encoded feature sets are then processed through the matching layer to identify possible matches. The results of the matching layer is aggregated and, then, based on the aggregation, a classification is applied. The output of the classification is a probability associated with at least a pair of general questions, that the general questions are duplicates. Comparing the results of the classification to the actual pairs that are known provides a first set of losses. In other words, the first set of losses is a measure of how well the general network processed the general questions and the matching layer matched the general questions.

In Step 303, a target domain network is applied to domain specific question pairs to obtain a second set of losses. In one or more embodiments, the target domain network acts in a similar manner to the general network, however, the target domain network is specific to domain specific questions and uses the domain specific feature layer rather than the general feature layer. In one or more embodiments, the encoded vectors are fed into a Bi-LSTM layer followed by the matching layers. The matching layers are then aggregated, and classification is applied. The results from the classification is the probability that the domain specific questions are duplicates. The losses is a measure of the mismatch between the training data and data distributions, where the second set of losses are specific to the training of the target domain network.

In Step 305, a domain distinguishing network is applied to a set of domain specific question and general question to obtain a third set of losses. In one or more embodiments, the domain distinguishing network may be an adversarial domain network that is designed to identify the domain discriminators in the domain specific questions and general questions. In other words, the domain distinguishing network is trained to classify whether a question is in the general domain versus whether a question is in the target domain. To perform the determination, the domain distinguishing network operates on both the domain specific questions and the general domain questions. The third set of losses is a measure of how well the domain distinguishing network classified the respective questions.

In some embodiments, the domain discrimination loss may be maximized. In other words, maximizing the domain discrimination loss is to maximize the inability of the domain distinguishing network from being able to distinguish between domain specific questions and general questions.

Alternatively, in one or more embodiments may use a reverse gradient approach rather than maximize the domain discrimination loss. The reverse gradient (i.e., gradient reversal) layer is between the shared feature layer and a domain distinguishing layer of the domain distinguishing network. The reverse gradient layer may ensure that the domain discriminator is trained in an adversarial fashion with opposing objectives for the shared feature layer and domain distinguishing layer. In one or more embodiments, the reverse gradient layer ensures that the feature sets for the target domain network and the general network are closer. During the forward pass, the reverse gradient layer acts as an identity transform and, in the backward pass, the reverse gradient layer takes the gradient from the subsequent level and multiplies the gradient before passing the result to the preceding layers.

In one or more embodiments, the domain distinguishing network utilizes a domain classification layer. In one or more embodiments, the domain classification layer receives data from the previous layers and learns to distinguish between general network and target domain network as the training progresses. In other words, the domain classification layer learns to determine the questions that are general questions the questions that are domain specific questions.

In Step 307, the general feature layer and domain classification layer is applied to the general questions to obtain a fourth set of losses. The fourth set of losses is a measure of the domain classification layer being able to classify the general questions as being general questions based on features extracted using the general feature layer. A goal is to modify the general feature layer so as to make classification by the domain classification layer harder.

In Step 307, the domain specific feature layer and domain classification layer is applied to the domain specific questions to obtain a fifth set of losses. The fifth set of losses is a measure of the domain specific feature layer being able to classify the domain specific questions as being domain specific questions based on features extracted using the domain specific feature layer. A goal is to modify the domain specific feature layer so as to make classification by the domain classification layer harder.

In Step 311, an accumulated gradient from the set of losses is calculated. The accumulated gradient is a function of the partial derivatives of the various sets of losses.

In Step 313, the features are updated in the feature layers according to the accumulated gradients to generate trained target domain network. In one or more embodiments, the backward pass is incorporated back into the overall BiMPM as a method of training the model.

An example of calculating the accumulated gradients based on the sets of losses is presented in the following equations below.

$$\theta q \leftarrow \theta q - \mu\left(\frac{\partial Ly1}{\partial L\theta q}\right) - \lambda\left(\frac{\partial Ldu1}{\partial L\theta q}\right) \quad \text{(Eq. 1)}$$

$$\theta s \leftarrow \theta s - \mu\left(\frac{\partial Ly1}{\partial L\theta s}\right) - \lambda\left(\frac{\partial Ly2}{\partial L\theta s}\right) - \lambda\left(\frac{\partial Lds}{\partial L\theta s}\right) \quad \text{(Eq. 2)}$$

$$\theta t \leftarrow \theta t - \mu\left(\frac{\partial Ly2}{\partial L\theta t}\right) - \lambda\left(\frac{\partial Ldu2}{\partial L\theta t}\right) \quad \text{(Eq. 3)}$$

Where,

θq=general domain features
θt=target domain features
θs=shared domain features
Ly1=general network deduplication loss (i.e., first set of losses)
Ly2=target domain deduplication loss (i.e., second set of losses)
Ldu1=general domain specific adaptation loss (i.e., fourth set of losses)
Ldu2=target domain specific adaptation loss (i.e., fifth set of losses)
Lds=adversarial domain adaptation loss (i.e., third set of losses)
μ=a constant that weighs the amount that the network loss affects the parameter of the feature
λ=a constant that weighs the amount that the domain discrimination loss affects the parameter of the feature As shown in the above, general domain features (θq) are the features in the general feature layer(s) and are updated according to Eq. 1. The target domain features (θt) are the features in the domain specific feature layer and are updated according to Eq. 2. The shared domain features (θs) are features in the shared feature layer(s) and are updated according to Eq. 3.

In Step 315, a determination is made to continue the training. The training may continue if the results produced by the model do not meet a pre-determined allowable error threshold. Additionally, the training may continue if more questions may be used to feed into the model. If the training is continued, the process repeats and returns to Step 301. If the training is not continued, the process ends.

Figure 4:
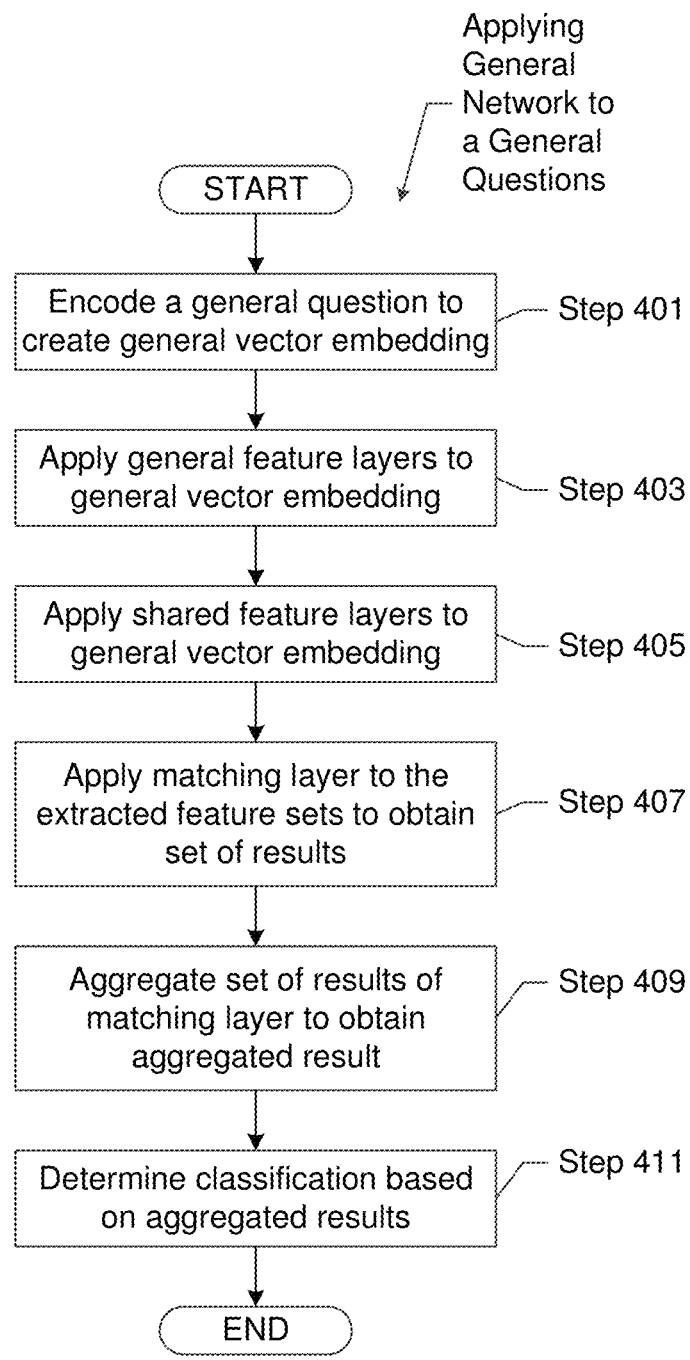
FIG. 4 shows a method for applying a general network to a question pair in accordance with one or more embodiments.

FIG. 4 shows a method for applying a general network to general questions in the training data to identify duplicate questions. FIG. 4 is an expansion of Step 301 in FIG. 3 in one or more embodiments. In Step 401, a general question is encoded to create a general vector embedding. Specifically, the word to indices mapping is applied to each word in the question in one or more embodiments to create the general vector embedding.

In Step 403, a general feature layer is applied to the general vector embedding. Further, in Step 405, a shared feature layer is applied to the general vector embedding. Steps 403 and 405 may be performed concurrently as part of the RNN. The general vector embedding is processed through the RNN, whereby both sets of feature layers are used in processing the general vector embedding. The RNN may process input sequences of arbitrary length (i.e., short questions, long questions, etc.). The RNN processes one word at a time. In other words, a single question is represented as a sequence of words and each word may be represented as an embedding vector. The embedding vector is the input to the RNN and each word is provided as input one word at a time in accordance with one or more embodiments. The RNN is designed to produce an accurate representation of the "meaning" of the question up to the current word being fed to the RNN. In other words, the "meaning" of the question changes and becomes more accurate as each word is fed to the RNN as the RNN keeps internal information about the best possible representation of the sequence of words input into the RNN thus far. When a new word is fed to the RNN, the RNN updates the internal states of the RNN and outputs the latest representation of the "meaning" to that point (i.e. word) of the question. The output is an extracted feature set that represents the meaning of the general question.

Steps 401, 403, and 405 are applied to the various general questions in the training data to obtain an extracted feature set for each input general question.

In Step 407, a matching layer is applied to the extracted feature sets to obtain a set of results. The matching layer identifies matches between the individual extracted feature sets. As described above, multiple matching algorithms may be applied to the extracted feature sets to obtain multiple different results. The multiple results are the sets of general questions that each of the matching algorithms have identified as being duplicates.

In Step 409, the set of results from the matching layer is aggregated to obtain an aggregated result. The aggregated result may be obtained through a concatenation operation. In other words, an aggregation layer receives the two outputs from the matching layer (i.e., the two extracted feature sets) and concatenates the two outputs together to form the aggregated results. The aggregated results groups the outputs of each of the matching algorithms into a single set of results.

In Step 411, a classification is determined based on the aggregated result. In one or more embodiments, the classification layer is a neural network, different from the domain distinguishing network, target domain network, or general network. The neural network of the classification layer uses the aggregated results grouped as an input and the output is a neuron with the decision "match" or "not match". In other words, the classification determines if the pair of questions is a duplicate or not duplicated.

Figure 5:
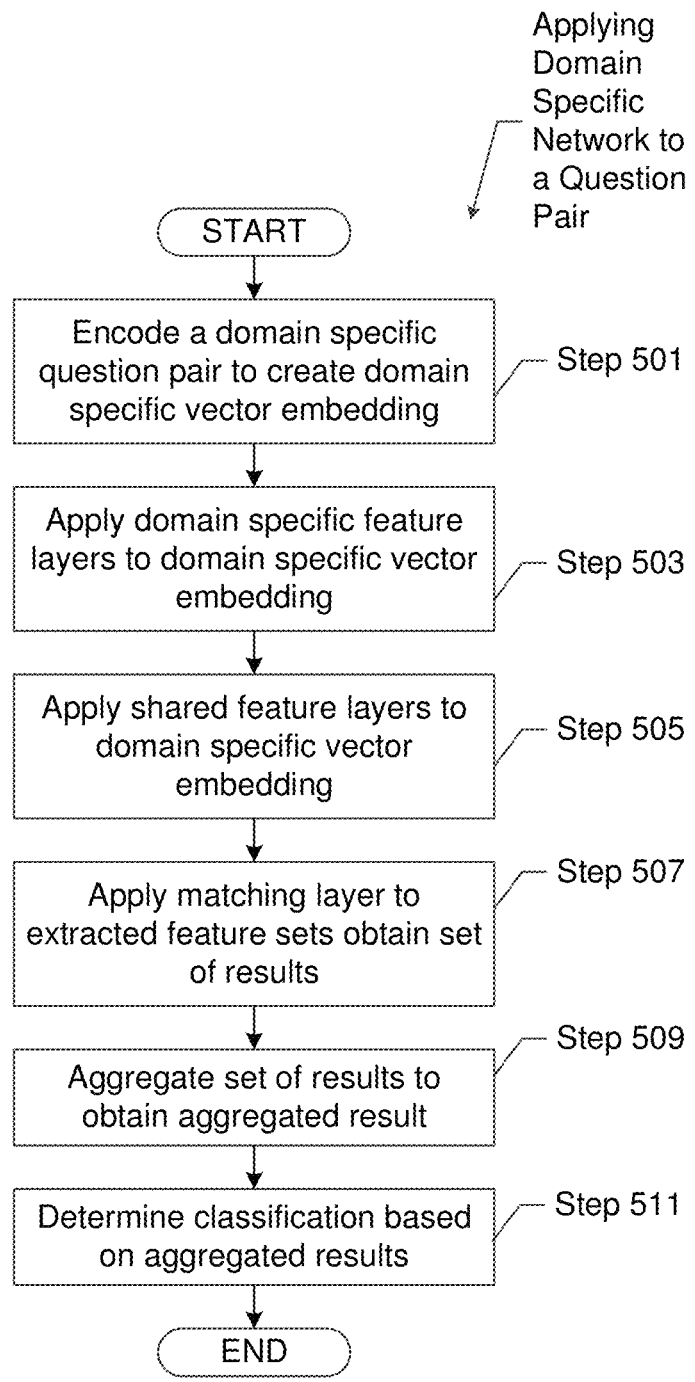
FIG. 5 shows a method for applying a specific network to a question pair in accordance with one or more embodiments.

FIG. 5 shows a method for applying a target domain network to a domain specific question pair. While FIG. 5 applies to a target domain network, the steps and method may be similar to the general network method described in FIG. 4. FIG. 5 is an expansion of Step 303 in FIG. 3 in one or more embodiments. In Step 501, a domain specific question is encoded to create a domain specific vector embedding. Step 501 may be performed similar to Step 401 of FIG. 5, but with the domain specific question in the domain specific training data.

In Step 503, a domain specific feature layer is applied to a domain specific question vector embedding. In Step 505, the shared feature layer is applied to the domain specific vector embedding. Steps 503 and 505 may be performed in a similar manner to Steps 403 and 405 described above with reference to FIG. 4, but using the target domain network, and may be applied to each vector embedding for the training domain specific questions. The result is the extracted feature sets that represent the meaning of the domain specific questions in the training data.

In Step 507, a matching layer is applied to the extracted feature sets to obtain a set of results. In Step 509, the set of results from the shared matching layer is aggregated to obtain an aggregated result. In Step 511, a classification is determined based on the aggregated result. Steps 507, 509, and 511 may be performed in a similar manner to Steps 407, 409, and 411 described above with reference to FIG. 4.

Figure 6:
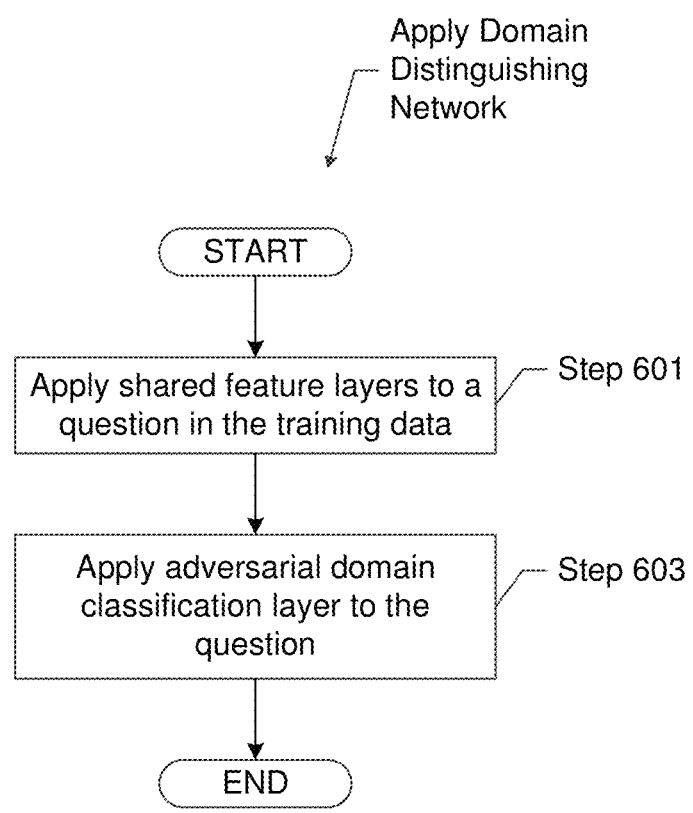
FIG. 6 shows a method for applying a domain distinguishing network in accordance with one or more embodiments.

FIG. 6 shows a method for applying a domain distinguishing network. FIG. 6 may expand Step 305 of FIG. 3. In Step 601, the shared features layer is applied to a question. The question may be a domain specific question or a general question. In one or more embodiments, the domain distinguishing network is trained such that half of the questions are general questions and half the questions are domain specific questions. The questions may be first encoded with the word to indices mapping to create a vector embedding for each question. The shared feature layers are used to create an extracted feature set. In Step 603, the adversarial domain classification layer is applied to classify whether the extracted feature set is for a general question or a domain specific question. By comparing the result of the classification with the actual result, a set of losses are generated that is indicative of the accuracy.

Figure 7:
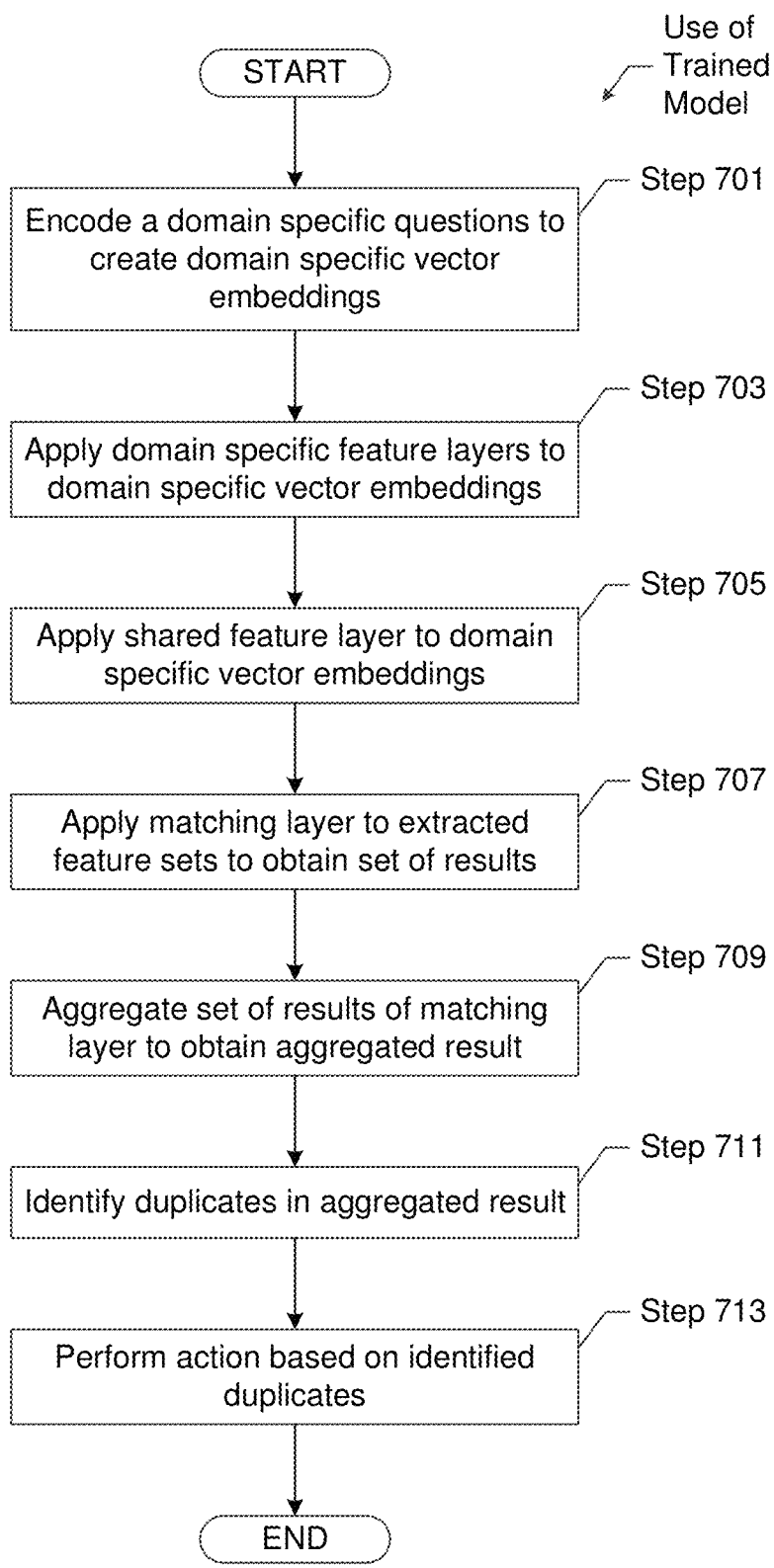
FIG. 7 shows a method for using a trained model in accordance with one or more embodiments.

FIG. 7 shows a method for using the trained model. The Steps of FIG. 7 may be performed in real time to determine whether a question asked by a user has already been answered (e.g., compare a new question to a repository of existing questions). As another example, the Steps of FIG. 7 may be performed on a repository of existing questions in order to reduce the size of the repository, aggregate responses or perform other storage enhancements.

In Step 701, the domain specific questions are encoded to create a domain specific vector embedding. The domain specific vector embedding may be a numerical form of the previously worded domain specific question. In one or more embodiments, the encoding is carried out using a word to indices mapping.

In Step 703, a domain specific feature layer is applied to the domain specific vector embeddings. The domain specific feature layer determines the domain specific features of the domain specific vector embeddings. In Step 705, a shared features layer is applied to the domain specific vector embeddings. Steps 703 and 705 may be performed in a similar manner to Steps 503 and 505 of FIG. 5. Because the target domain network is trained using the general network, and therefore has a larger training data set, the output of the extracted feature sets for the target domain network is more accurate for the purposes of identifying matches.

In Step 707, the matching layer is applied to the extracted feature sets to domain specific questions to obtain a set of results. Each matching algorithm is applied to the corpus of the extracted features sets to identify matches. If the operations of FIG. 7 are performed to determine whether a match exists with a single question from the user (i.e., user question), then the matching algorithms are applied to determine whether the extracted feature set created from the user question matches any extracted feature set in the corpus. If the operations of FIG. 7 are performed to determine whether duplicate questions exist in the repository, then the matching algorithms are applied to determine whether the extracted feature sets have duplicates (e.g., comparison with each other).

In Step 709, the set of results from the matching layer is aggregated to obtain an aggregated result. In Step 711, a classification is determined based on the aggregated results. Steps 709 and 711 may be performed in a similar manner as discussed above with reference to Step 509 and 511 of FIG. 5.

In Step 713, an action is performed based on the identified duplicates. For example, if the operations are performed to determine whether a real time user question already has an answer, then the action may be to present the matched questions and answers of the determined duplicates to the user. For example, the user may be presented with an option to select a similar question that is identified as a duplicate and receive answers that are related in the repository to the similar question. As another example, if the operations are performed to reduce storage, then a question may be selected from each set of duplicates. The question may be selected based on the number of answers to the question or metadata about the answers. The remaining unselected questions in the set of duplicates may be deleted. Answers related to the unselected questions may be deleted or aggregated. The removal of the unselected questions from the data repository allows the data repository to operate more efficiently and to free space for better overall performance.

Figure 8:
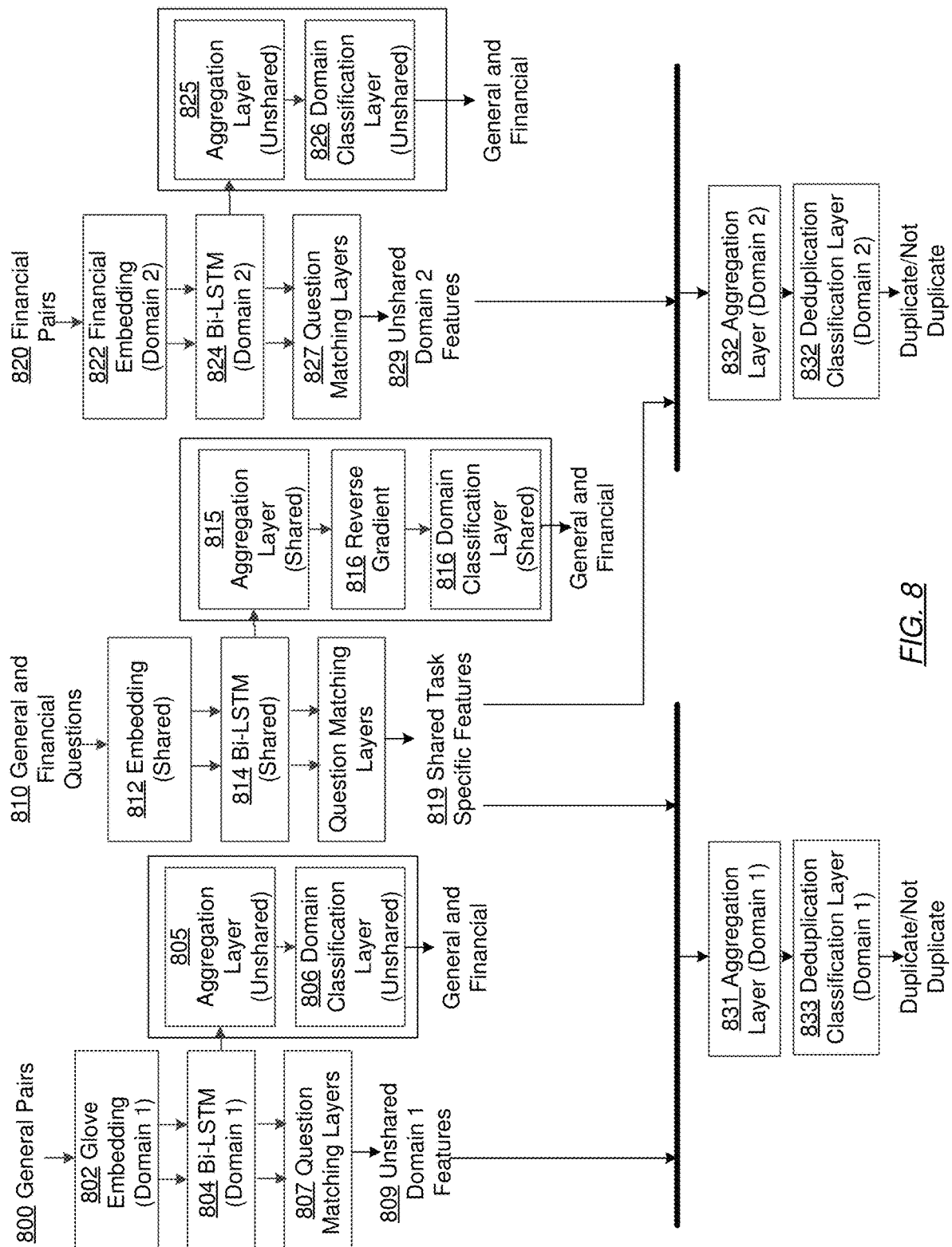
FIG. 8 shows an example in accordance with one or more embodiments.

The following example is for explanatory purposes only and not intended to limit the scope of the invention. FIG. 8 shows an example in accordance with one or more embodiments of the invention. The example shows a set of general pairs (800), a set of financial pairs (820), and the combination of the general pairs and financial pairs (810). The general pairs (800) are a pair of general questions that are paired together based on being duplicates. The general pairs (800) are first sent to a glove embedding layer (802) where the general pairs are converted to vectors in the vector space. After the vector conversion, the general pairs (800) are sent to the Bi-LSTM layer (804), which generates extracted feature sets for the general pairs. The extracted feature sets are matched using four different kinds of matching layers (807): full matching, max pooling matching, attentive matching, and max attentive matching. The results of the matching layers (807) are aggregated in aggregation layer (831), and the aggregated results are classified in deduplication classification layer (833).

The extracted feature sets from the Bi-LSTM for the general questions are further are aggregated in the aggregation layer (805) before passed to the domain classification layer to generate the set of losses for the general questions. The domain classification layer (806) determines which words are part of the domain and which words are general words. The result produces unshared domain 1 features (809).

The financial pairs (820) follow similar steps as the general pairs (800). The financial pairs (820) are a pair of financial questions that are paired together. The financial pairs (820) are first sent to a financial embedding layer (822) where the financial pairs (820) are converted to vectors in the vector space. After the vector conversion, the financial pairs (820) are sent to the Bi-LSTM layer (824) to created extracted feature sets. The extracted feature sets are matched into four different kinds of matching layers (827): full matching, max pooling matching, attentive matching, and max attentive matching. The results of the matching layers (807) are aggregated in aggregation layer (832), and the aggregated results are classified in deduplication classification layer (834).

The extracted feature sets from the Bi-LSTM for the domain specific questions are further are aggregated in the aggregation layer (825) before passed to the domain classification layer (826) to generate the set of losses for the domain specific questions. The domain classification layer (826) determines which words are part of the domain and which words are general words. The result produces unshared domain 2 features (829).

The general and financial questions (810) are also processed by the domain distinguishing network. The general and financial questions (810) are first sent to an embedding layer (812) where the general and financial questions (810) are converted to vectors in the vector space. The extracted feature sets are sent to an aggregation layer (815), a reverse gradient (816), and a domain classification layer (817). The reverse gradient (816) forces the general and financial pairs (710) to produce a feature map that closes the gap between the 2 domains. The aggregation layer (815) aggregates the outputs from the reverse gradient and four matching functions before passing the aggregated output to the domain classification layer (817). The result produces shared specific features (819).

At each endpoint, a set of losses are generated that reflects the accuracy of the process. Based on the set of losses, the machine learning model is updated.

Figure 9:
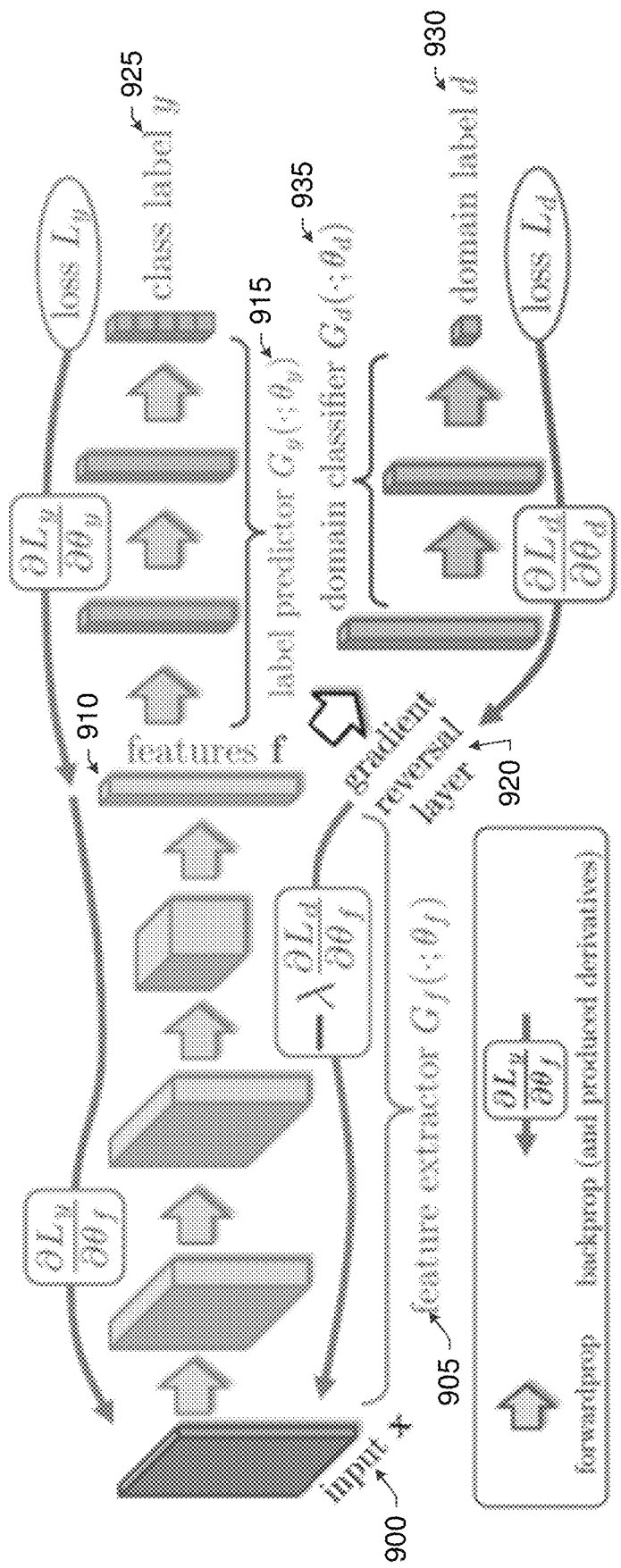
FIG. 9 shows an example in accordance with one or more embodiments.

FIG. 9 shows an example of the forward and backward losses in accordance with one or more embodiments. An input (900) is fed through the feature extractor (905) to produce the features (910). Within the feature extractor (905) exist layers that the input (900) is passed through. The forward arrows show the path of the input (900) through the feature extractor (905) to produce the features (910), while the backwards arrow shows the produce derivatives and losses from producing the features (910). The result of the losses from producing the features is the derivative $$\frac{\partial Ly}{\partial \Theta f},$$

which represents the feature losses, and $$-\lambda \frac{\partial Ld}{\partial \Theta f},$$

which represents the domain losses. The features (910) are then fed into a label predictor (915) and a gradient reversal layer (920). The label predictor (915) determines a class label (925) for the input (900), which is the equivalent of the general output. The label predictor (915) results in a loss represented by the derivative $$\frac{\partial Ly}{\partial \Theta y}$$

and has an overall aggregated loss of Ly.

The gradient reversal layer (920) forces the input (900) into a domain classifier (935) to determine the domain label (930) of the input (900), which is the equivalent of the domain specific output. The domain classifier (935) results in a loss represented by the derivative $$\frac{\partial Ld}{\partial \Theta d}$$

and has an overall aggregated loss of Ld. The aggregated losses Ly and Ld are further aggregated to update the various layers.

Embodiments of the invention may be implemented on a computing system. Any combination of mobile, desktop, server, router, switch, embedded device, or other types of hardware may be used. For example, as shown in FIG. 10.1, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1000) in FIG. 10.1 may be connected to or be a part of a network. For example, as shown in FIG. 10.2, the network (1020) may include multiple nodes (e.g., node X (1022), node Y (1024)). Each node may correspond to a computing system, such as the computing system shown in FIG. 10.1, or a group of nodes combined may correspond to the computing system shown in FIG. 10.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1000) may be located at a remote location and connected to the other elements over a network.

Although not shown in FIG. 10.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026)

and transmit responses to the client device (1026). The client device (1026) may be a computing system, such as the computing system shown in FIG. 10.1. Further, the client device (1026) may include and/or perform all or a portion of one or more embodiments of the invention.

The computing system or group of computing systems described in FIGS. 10.1 and 10.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 10.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10.1, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 10.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 10.1 and the nodes and/or client device in FIG. 10.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
applying a general network to a plurality of general question pairs encoded with a plurality of general vector embeddings to obtain a first set of losses, wherein the general network comprises a general feature layer and a shared feature layer;
applying a target domain network to a plurality of domain specific question pairs encoded with a plurality of domain specific vector embeddings to obtain a second set of losses, wherein the target domain network comprises a domain specific feature layer and the shared feature layer;
applying a domain distinguishing network to a set of domain specific questions and a set of general questions to obtain a third set of losses,
wherein the domain distinguishing network comprises a gradient reversal layer and the shared feature layer, wherein the shared feature layer spans the general network, the target domain network, and the domain distinguishing network, and wherein the domain distinguishing network is configured to generate a set of gradients to train the target domain network based on the plurality of domain specific questions and the plurality of general questions;

calculating a set of accumulated gradients from the first set of losses, the second set of losses, and the third set of losses; and updating a plurality of features according to the set of accumulated gradients to train the target domain network.

2. The method of claim 1, further comprising:

applying the general feature layer and a domain classification layer to a set of general questions to obtain a fourth set of losses, wherein calculating the set of accumulated gradients is further performed using the fourth set of losses.

3. The method of claim 1, further comprising:

applying the domain specific feature layer and a domain classification layer to a set of domain specific questions to obtain a fifth set of losses, wherein calculating the set of accumulated gradients is further performed using the fifth set of losses.

4. The method of claim 1, wherein applying the target domain network comprises:

encoding a domain specific question to create a domain specific vector embedding, the domain specific question in the plurality of domain specific question pairs;

applying the domain specific feature layer and the shared feature layer to the domain specific vector embedding to obtain an extracted feature set for the domain specific question;

applying a matching layer to a plurality of extracted feature sets to obtain a set of results, the plurality of extracted feature sets comprising the extracted feature set; and determining a classification based on the set of results, the classification identifying whether the domain specific question is a duplicate.

5. The method of claim 4, further comprising:

applying a plurality of matching algorithms to the plurality of extracted feature sets to obtain a plurality of sets of results; and aggregating the plurality of sets of results into an aggregated result, wherein the classification is performed based on the aggregated result.

6. The method of claim 4, wherein calculating the set of accumulated gradients comprises:

calculating a first set of accumulated gradients for the domain specific feature layer, wherein the domain specific feature layer is updated using the first set of accumulated gradients; and calculating a second set of accumulated gradients for the shared feature layer, wherein the shared feature layer is updated using the second set of accumulated gradients.

7. The method of claim 1, wherein applying the general network comprises:

encoding a general question to create a general vector embedding, the general question in the plurality of general question pairs;

applying the general feature layer and the shared feature layer to the general vector embedding to obtain an extracted feature set for the general question;

applying a matching layer to a plurality of extracted feature sets to obtain a set of results, the plurality of extracted feature sets comprising the extracted feature set; and determining a classification based on the set of results, the classification identifying whether the general question is a duplicate.

8. The method of claim 1, wherein applying the domain distinguishing network comprises:

applying the shared feature layer to a question in a training data to obtain an extracted feature set; and applying adversarial domain classification layer to the extracted feature set for the question to classify the question as a general question or a domain specific question.

9. The method of claim 1, further comprising:

encoding a plurality of domain specific questions to create a plurality of domain specific vector embeddings;

applying the domain specific feature layer and a shared feature layer to the domain specific vector embeddings to obtain a plurality of extracted feature sets;

applying a matching layer to the plurality of extracted feature sets to obtain a set of results;

aggregating the set of results to obtain an aggregated result;

identifying a plurality of duplicates in the aggregated results; and performing an action based on the plurality of duplicates.

10. A system comprising:

a data repository comprising:
  a plurality of domain specific questions, and
  a plurality of general questions;

a general network comprising a general feature layer and a shared feature layer;

a target domain network comprising a domain specific feature layer and the shared feature layer; and a domain distinguishing network comprising a gradient reversal layer and the shared feature layer, wherein the shared feature layer spans the general network, the target domain network, and the domain distinguishing network, and wherein the domain distinguishing network is configured to generate a set of gradients to train the target domain network based on the plurality of domain specific questions and the plurality of general questions;

a processor; and a memory comprising an application that executes on the processor and is configured for:

applying the general network to a plurality of general question pairs encoded with a plurality of general vector embeddings to obtain a first set of losses, applying the target domain network to a plurality of domain specific question pairs encoded with a plurality of domain specific vector embeddings to obtain a second set of losses, applying the domain distinguishing network to the plurality of domain specific questions and the plurality of general questions to obtain a third set of losses;

calculating a set of accumulated gradients from the first set of losses, the second set of losses, and the third set of losses, and updating a plurality of features according to the set of accumulated gradients to train the target domain network.

11. The system of claim 10, further comprising:
a matching layer implementing a plurality of matching algorithms to identify duplicates based on output from the general network and the target domain network.

12. The system of claim 10, further comprising:
a vector engine comprising instructions executing on the processor and configured to generate a vector embedding using a word to index mapping.

13. A non-transitory computer readable medium comprising computer readable program code for causing a computer system to perform operations, the operations comprising:
applying a general network to a plurality of general question pairs encoded with a plurality of general vector embeddings to obtain a first set of losses, wherein the general network comprises a general feature layer and a shared feature layer;
applying a target domain network to a plurality of domain specific question pairs encoded with a plurality of domain specific vector embeddings to obtain a second set of losses, wherein the target domain network comprises a domain specific feature layer and the shared feature layer;
applying a domain distinguishing network to a set of domain specific questions and a set of general questions to obtain a third set of losses,
wherein the domain distinguishing network comprises a gradient reversal layer and the shared feature layer,
wherein the shared feature layer spans the general network, the target domain network, and the domain distinguishing network, and
wherein the domain distinguishing network is configured to generate a set of gradients to train the target domain network based on the plurality of domain specific questions and the plurality of general questions;
calculating a set of accumulated gradients from the first set of losses, the second set of losses, and the third set of losses; and
updating a plurality of features according to the set of accumulated gradients to train the target domain network.

14. The non-transitory computer readable medium of claim 13, further comprising:
applying the general feature layer and a domain classification layer to the set of general questions to obtain a fourth set of losses,
wherein calculating the set of accumulated gradients is further performed using the fourth set of losses.

15. The non-transitory computer readable medium of claim 13, further comprising:
applying the domain specific feature layer and a domain classification layer to the set of domain specific questions to obtain a fifth set of losses,
wherein calculating the set of accumulated gradients is further performed using the fifth set of losses.

16. The non-transitory computer readable medium of claim 13, wherein applying the target domain network comprises:
encoding a domain specific question to create a domain specific vector embedding, the domain specific question in the plurality of domain specific question pairs;
applying the domain specific feature layer and the shared feature layer to the domain specific vector embedding to obtain an extracted feature set for the domain specific question;
applying a matching layer to a plurality of extracted feature sets to obtain a set of results, the plurality of extracted feature sets comprising the extracted feature set; and
determining a classification based on the set of results, the classification identifying whether the domain specific question is a duplicate.

17. The non-transitory computer readable medium of claim 16, further comprising:
applying a plurality of matching algorithms to the plurality of extracted feature sets to obtain a plurality of sets of results; and
aggregating the plurality of sets of results into an aggregated result, wherein the classification is performed based on the aggregated result.

18. The non-transitory computer readable medium of claim 16, wherein calculating the set of accumulated gradients comprises:
calculating a first set of accumulated gradients for the domain specific feature layer, wherein the domain specific feature layer is updated using the first set of accumulated gradients; and
calculating a second set of accumulated gradients for the shared feature layer, wherein the shared feature layer is updated using the second set of accumulated gradients.

19. The non-transitory computer readable medium of claim 13, wherein applying the general network comprises:
encoding a general question to create a general vector embedding, the general question in the plurality of general question pairs;
applying the general feature layer and the shared feature layer to the general vector embedding to obtain an extracted feature set for the general question;
applying a matching layer to a plurality of extracted feature sets to obtain a set of results, the plurality of extracted feature sets comprising the extracted feature set; and
determining a classification based on the set of results, the classification identifying whether the general question is a duplicate.

20. The non-transitory computer readable medium of claim 13, wherein applying the domain distinguishing network comprises:
applying the shared feature layer to a question in a training data to obtain an extracted feature set; and
applying adversarial domain classification layer to the extracted feature set for the question to classify the question as a general question or a domain specific question.

* * * * *